Dec. 2, 1941.  W. E. JOHNSON  2,264,847

REFRIGERATING APPARATUS

Filed May 10, 1939

Inventor:
Wilfrid E. Johnson,
by Harry E. Dunham
His Attorney.

Patented Dec. 2, 1941

2,264,847

UNITED STATES PATENT OFFICE 2,264,847

REFRIGERATING APPARATUS

Wilfrid E. Johnson, Fort Wayne, Ind., assignor to General Electric Company, a corporation of New York Application May 10, 1939, Serial No. 272,853

4 Claims. (Cl. 230—206)

My invention relates to motor compressors and more particularly to sealed motor compressor units for use with refrigerating apparatus.

It is an object of my invention to provide a new and improved motor compressor unit of the sealed type which is rugged in construction, compact and simple in arrangement, and efficient in operation.

With apparatus of this type the lubricant used for lubricating the shaft operatively connecting the driving motor and the compressor leaks from the end bearing of the motor into the motor compartment. This action serves to deplete the supply of lubricant available for lubricating the compressor and if the level of lubricant in the motor compartment is permitted to reach the level of the air gap excessive power losses result. Hence, it is a further object of my invention to provide new and improved means for returning the lubricant from the motor compartment to the compressor chamber.

Further objects and advantages of my invention will become apparent as the following description proceeds and the features of novelty which characterize my invention will be pointed out with particularity in the claims annexed to and forming a part of this specification.

Figure 1:
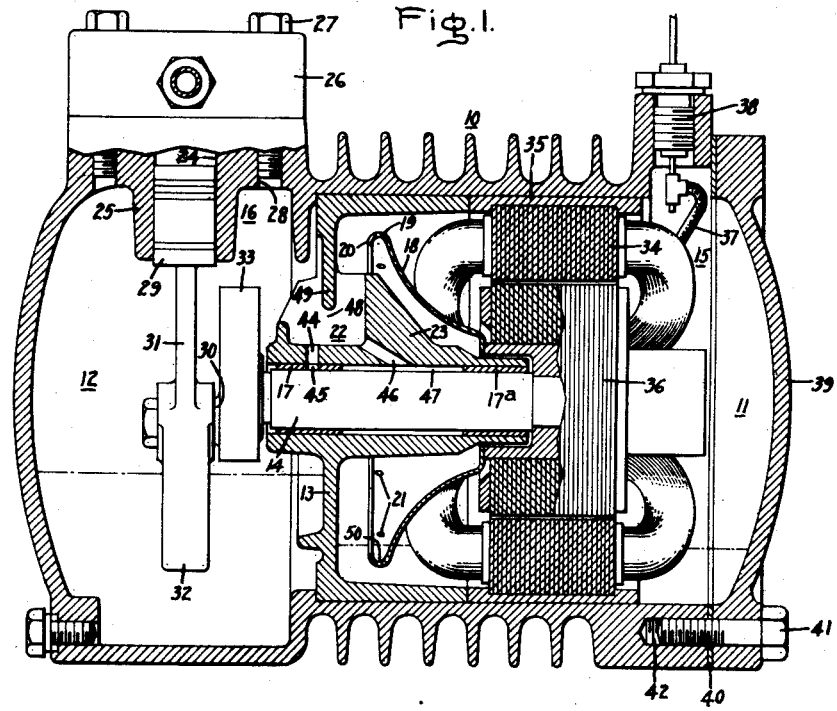
Figure 2:
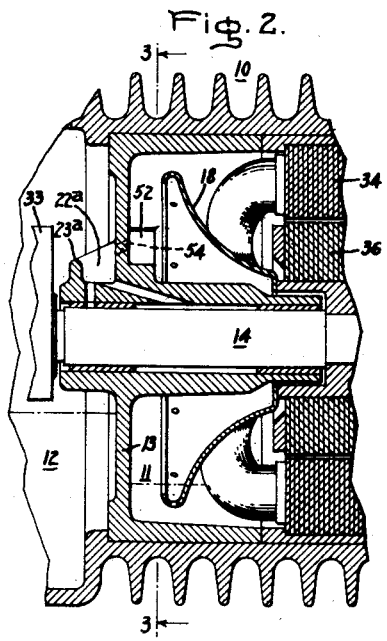
Figure 3:
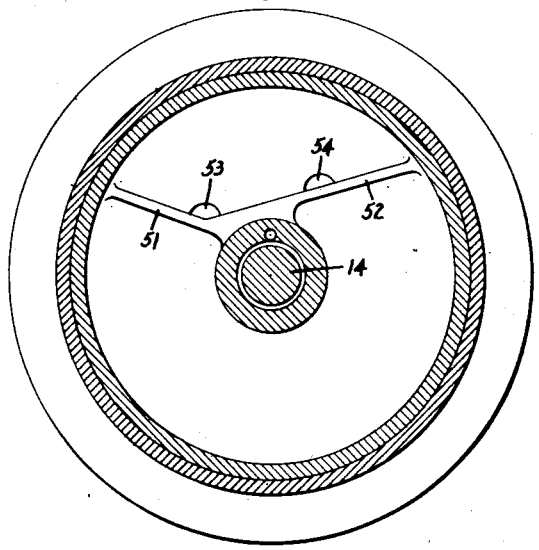

For a better understanding of my invention reference may be had to the accompanying drawing in which Fig. 1 is a side elevational view, partly in section, of a motor compressor unit embodying the principles of my invention; Fig. 2 is a partial sectional view of a modification of the motor compressor unit shown in Fig. 1; and Fig. 3 is a sectional view of the modified form of my invention shown in Fig. 2 taken along the line 3—3 of Fig. 2.

With particular reference to Fig. 1 of the drawing I have shown a motor compressor unit having a casing 10 divided into a motor compartment 11 and a compressor compartment or chamber 12 by a partition 13. A rotatable shaft 14 is carried by the partition 13 and operatively connects the motor 15 and the compressor 16. In order to return the lubricant which leaks past the bearings 17 and 17a into the motor compartment 11 to the compressor compartment 12, I have provided a deflector 18 arranged to rotate with the shaft 14. In order to minimize the amount of lubricant thrown from the deflector in a sidewise direction I have provided the rim 19 of the deflector 18 with an inturned portion or lip 20. I have also provided a plurality of openings 21 in the rim 19 of the deflector 18.

In operation, lubricant leaking through the bearings 17 and 17a will flow into the deflector 18. Due to the presence of the lip 20 lubricant cannot be thrown off the edge of the deflector 18 but because of the holes or openings 21 the centrifugal force set up by the rotation of deflector 18 the lubricant will be forced through the openings 21 and thrown from the deflector 18 against the walls of the casing 10. By making the openings relatively small in size the oil that is picked up in the lip cannot escape immediately so that a large portion of it is retained in the groove 50 formed at the edge of the deflector until the openings 21 reach the upper portion of their travel thereby insuring that most of the lubricant will be thrown against the upper portion of the casing 10 where it can drain into reservoir 22 located in the boss 23 formed in partition 13.

Referring to the drawing in greater detail, a cylinder 24 is formed in the cylinder block 25 which may be integral with the casing 10. I have also provided a cylinder head 26 exterior of the casing 10 secured to the casing 10 in some suitable manner as by means of threaded bolts 27 arranged to engage suitable tapped holes 28 in the cylinder block 25. Any suitable arrangement of intake and exhaust valves and inlet and exhaust chamber for the medium to be compressed may be employed. Inasmuch as the arrangement does not form part of my invention, details have not been illustrated. Although a single cylinder has been illustrated, my invention is equally applicable to multi-cylinder compressors.

In order to compress the working fluid I have provided a piston 29 adapted to reciprocate in the cylinder 24. The driving mechanism for the piston 29 comprises a crank pin 30 and a connecting rod 31. The crank pin 30 is driven from the rotatable shaft 14 which turns in central bearings 17 and 17a suitably retained in the boss 23 of the partition 13. In order to balance the compressor, I have provided counter-weights 32 and 33. I may attach to either or both of the counter-weights 32 and 33 oil dippers (not shown) to throw the lubricant against the upper portion of the compressor chamber 12 for lubricating the piston 29 and supplying lubricant for lubricating the shaft 14. In some cases the oil dippers may be omitted and the splashing created by the counter-weights 32 and 33 may be sufficient for the lubricating purpose.

The motor chamber 11 houses a motor 15 having a stator element 34 suitably secured to a sleeve 35 which in turn is suitably arranged in the casing 10. The motor 15 is also provided with a rotor element 36 secured to the shaft 14. Lead wires 37, one of which is illustrated, for the motor 15 are brought into the motor compartment 11 through a suitable seal 38. The end plate 39 is provided to close the open end of the casing 10 and is drawn to the casing 10 by means of threaded bolts 41 engaging suitable tapped holes 42 in casing 10, a gasket 40 being provided to seal the space between end plate 39 and casing 10.

In order to lubricate the shaft 14, I have provided a pocket or reservoir 22 in the partition 13 of the casing 10. As shown in Fig. 1, this reservoir extends on both sides of the partition 13. A passage 44 extends through the boss 23 and communicates between the reservoir 22 and a suitable opening 45 in the bearing 17. I have provided a second passage 46 in the boss 23 communicating between the reservoir 22 and an annular recess 47 extending around the shaft 14 between the bearings 17 and 17a. The portion of the shaft 14 which turns in bearing 17a is lubricated by the lubricant which works therebetween from the recess 47. In order to prevent lubricant from being thrown from the compressor compartment 12 into the motor compartment 11 through the opening 48 in the partition 13 at the reservoir 22, I have provided the partition 13 with a baffle portion 49 extending downwardly into the reservoir 22.

In order to return the leakage lubricant from the motor compartment 11 to the compressor compartment 12 I have provided the deflector plate 18 which is suitably secured to the shaft 14 for rotation therewith. If a flat disk is used as a deflector plate, most of the fluid picked up by the deflector will be thrown off at approximately 45° from the level of the lubricant so that most of the lubricant will be thrown against the lower portions of the side walls of the casing 10. It is desirable to pick up oil or lubricant from the motor chamber 11 and splash it or throw it to the top or upper portions of the walls of the motor compartment 11 and permit the lubricant to drain downwardly into the oil pocket or reservoir 22 provided in the bearing flange or partition 13. Hence, the rim 19 of the deflecting plate 18 is preferably bent laterally or inwardly to form a lip portion 20 thereby establishing a recess or groove 50 on the inner side of deflector plate 18. I have also provided a plurality of relatively small openings 21 at the bottom of groove 50 spaced at suitable intervals around the circumference of deflector plate 18. Lubricant in the groove 50 cannot escape immediately because of the lip 20 and a large portion of the lubricant is still in the groove 50 as the openings 21 reach the upper portion of the arc traversed by the edge of deflector 18. By properly proportioning the holes 21, therefore, the lubricant is expelled by centrifugal force through the holes or openings 21 at the top of the deflector. The openings 21 may be of any desired shape. Circular holes or open-ended slots extending to the edge of the lip 20 may be used, for example.

It is to be expected that not all of the lubricant will drain from the top wall into the reservoir 22 so that the lubricant dropping back into the bottom of the motor compartment 11 will help to raise the level of lubricant therein. By making the deflector plate 18 of a sufficiently large diameter, the level of lubricant within motor chamber 11 will not become high enough to enter the air gap between rotor 36 and stator 34.

While the groove 50 is shown concave in shape, that particular shape is not essential to my invention, although it is desirable to provide some sort of obstruction at the edge or rim of deflector plate 18 to retain the lubricant on deflector 18 long enough to insure that the lubricant passing the openings 21 will be thrown against the upper portions of the casing 10.

I have found that a deflector plate 18 having a diameter of five inches is satisfactory for a motor having a rotor 36 which is approximately three and a half inches in diameter, when the deflector plate 18 is provided with four substantially circular openings 21, equally spaced around the rim 19 on the deflector plate 18, and each opening 21 having a diameter of approximately one eighth of an inch.

In Figs. 2 and 3, I have illustrated a modification of my invention. A deflector plate 18, similar to that previously described, is used but the partition 13 is differently arranged. In this case a reservoir 22a is formed in the boss 23a of the partition 13 but wholly within the compressor compartment 12. Lubricant passages for conducting lubricant from the reservoir 22a to the shaft 14 are arranged in the same manner illustrated in Fig. 1. In order to collect the lubricant flowing down the partition 13 and return it to compressor compartment 12 I have provided inclined ribs 51 and 52 on the face presented toward the motor compartment 11 which cooperate with openings 53 and 54 through the partition 13 to return the lubricant to the reservoir 22a. While I have illustrated the use of two inclined ribs 51 and 52 and two openings 53 and 54, it will be understood that any number of ribs and openings may be provided.

While I have shown a particular embodiment of my invention I do not desire my invention to be limited to the particular construction shown and described and I intend in the appended claims to cover all modifications within the spirit and scope of my invention.

What I claim as new and desire to secure by Letters Patent of the United States is:

1. In combination with a compressor of the type including a casing having a partition dividing said casing into a motor compartment and a compressor compartment, a motor in said motor compartment, a compressor in said compressor compartment, a bearing for a rotating shaft in said partition, a rotating shaft in said bearing operatively connecting said motor and said compressor, and said partition having a lubricant passage for conducting lubricant from said compressor casing to said shaft, means including a rotatable deflector for returning to said compressor compartment lubricant which leaks through said bearing into said motor compartment, said deflector being constructed and arranged for hindering the expulsion of lubricant under centrifugal action, said means being provided with a plurality of openings for the passage of said lubricant, said means and said openings cooperating to insure the expulsion of a substantial amount of lubricant against the upper portions of the walls of said motor compartment.

2. In combination with a compressor of the type including a casing having a partition dividing said casing into a motor compartment and a compressor compartment, a motor in said motor compartment, said motor having a rotor element and a stator element, a compressor in said compressor compartment, a bearing in said partition for a rotating shaft, a rotating shaft in said bearing operatively connecting said motor and said compressor and said partition having a lubricant passage for conducting lubricant from said compressor casing to said shaft, means including a rotatable deflector for returning to said compressor compartment lubricant which leaks through said bearing into said motor compartment, said deflector constructed and arranged for hindering the expulsion of lubricant under centrifugal action, said deflector having a plurality of openings for the passage of said lubricant, and also having a diameter greater than the air gap between said rotor and said stator elements, said deflector and said openings cooperating to insure the expulsion of a substantial amount of lubricant against the upper portions of the walls of said motor compartment.

3. In combination with a compressor of the type including a casing having a partition dividing said casing into a motor compartment and a compressor compartment, a motor in said motor compartment, a compressor in said compressor compartment, said partition having a bearing for a rotating shaft, a rotating shaft in said bearing operatively connecting said motor and said compressor and said partition having a lubricant passage for conducting lubricant from said compressor casing to said shaft, means including a rotatable deflector for returning to said compressor compartment lubricant which leaks through said bearing into said motor compartment, the rim of said deflector having a laterally extending lip, said lip having a plurality of openings for the passage of said lubricant, said lip and said openings cooperating to hinder the escape of said lubricant by centrifugal action whereby a substantial amount of lubricant is thrown against the top wall of said motor compartment.

4. In combination, a casing having a partition dividing said casing into a motor compartment and a compressor compartment, a motor in said motor compartment, a compressor in said compressor compartment, said partition having a bearing for a rotating shaft, a rotating shaft in said bearing operatively connecting said motor and said compressor, said partition having a lubricant passage for conducting lubricant from said compressor casing to said shaft, and means including a rotatable deflector for returning to said compressor compartment lubricant which leaks through said bearing into said motor compartment, said deflector being generally cone-shaped and secured to said shaft for rotation therewith, a rim of said deflector having an inturned flange and a plurality of openings for the passage of said lubricant.

WILFRID E. JOHNSON.